US009734671B2

(12) United States Patent
Lee

(10) Patent No.: US 9,734,671 B2
(45) Date of Patent: Aug. 15, 2017

(54) GAMING MACHINE AND METHODS OF ALLOWING A PLAYER TO PLAY GAMING MACHINES HAVING RANDOMLY SELECTED SYMBOLS

(71) Applicant: Konami Gaming, Inc., Las Vegas, NV (US)

(72) Inventor: Arthur Lee, Las Vegas, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 951 days.

(21) Appl. No.: 13/758,655

(22) Filed: Feb. 4, 2013

(65) Prior Publication Data

US 2014/0221075 A1 Aug. 7, 2014

(51) Int. Cl.
*G06F 17/00* (2006.01)
*G07F 17/34* (2006.01)
*G07F 17/32* (2006.01)

(52) U.S. Cl.
CPC .............. *G07F 17/34* (2013.01); *G07F 17/32* (2013.01)

(58) Field of Classification Search
CPC .. G07F 17/3213; G07F 17/3267; G07F 17/34; G07F 17/32
See application file for complete search history.

(56) References Cited

U.S. PATENT DOCUMENTS 7,029,396 B2 * 4/2006 Jaffe et al. ...................... 463/20
2004/0204227 A1 * 10/2004 Johnson .......................... 463/20
2006/0183534 A1 * 8/2006 Yoshimi .......................... 463/20
2008/0045344 A1 * 2/2008 Schlottmann et al. ......... 463/42
2008/0167113 A1 7/2008 Plowman
2010/0210343 A1 * 8/2010 Englman et al. ............... 463/20
2011/0105216 A1 * 5/2011 Cohen et al. ................... 463/20
2011/0244942 A1 * 10/2011 Aoki .............................. 463/20

OTHER PUBLICATIONS

Patent Examination Report No. 1 (Apr. 18, 2013).
Patent Examination Report No. 2 (AU 2013200714)—Date of Issue Dec. 2, 2013.
Patent Examination Report No. 1 (AU 2014206223); Date of Issue: Sep. 2, 2014.

* cited by examiner

*Primary Examiner* — Dmitry Suhol
*Assistant Examiner* — Carl V Larsen
(74) *Attorney, Agent, or Firm* — Howard & Howard Attorneys PLLC

(57) ABSTRACT

A method of allowing a player to play a gaming machine is described herein. The method includes displaying a game including a plurality of reels displayed in a display area. Each reel of includes a reel strip including a plurality of normal symbols positions and a plurality of special symbol positions. The method includes randomly generating an outcome of the game and displays the game outcome on the display device, wherein the game outcome including at least one special symbol position being displayed on at least one reel of the plurality of reels in the display area. The method also includes determining a symbol selection factor as a function of the generated game outcome, randomly selecting at least one special symbol as a function of the symbol selection factor, and displaying the game outcome including the selected special symbol displayed in the special symbol position.

30 Claims, 11 Drawing Sheets

GAMING MACHINE AND METHODS OF ALLOWING A PLAYER TO PLAY GAMING MACHINES HAVING RANDOMLY SELECTED SYMBOLS

TECHNICAL FIELD

The subject matter disclosed herein relates generally to gaming machines and more particularly, to an apparatus and method for allowing players to play gaming machines having randomly selected symbols.

BACKGROUND OF THE INVENTION

Gaming machines, such as slot machines, are a cornerstone of the gaming industry. At least some known gaming machines include a video display device to display a reel game that includes a plurality of reels, wherein each reel includes a plurality of symbols. During game play, the gaming machine accepts a wager from a player, the player selects one or more paylines, the gaming machine spins the reels, and sequentially stops each reel to display the generated combination of symbols on the reels. The gaming machine then awards the player an award based on the combination of symbols orientated along the selected payline.

At least some known gaming machines display reels having a plurality of special symbols displayed within the reel. Known reels include a predefined number of special symbols displayed in each reel. Over time, during game play, the player may become aware of the number of special symbols that are displayed in each reel and may become frustrated because the number of special symbols within each reel remains constant for each game play. Accordingly, new features are necessary to appeal to player interest and enhance excitement in order to entice longer play and increased profitability. The present invention is directed to satisfying these needs.

SUMMARY OF THE INVENTION

In one aspect of the present invention, a method of allowing a player to play a gaming machine is provided. The method includes displaying a game including a plurality of reels displayed in a display area. Each reel includes a reel strip including a plurality of normal symbols positions and a plurality of special symbol positions. The method includes randomly generating an outcome of the game and displaying the game outcome on the display device. The game outcome includes at least one special symbol position being displayed on at least one reel of the plurality of reels in the display area. The method also includes determining a symbol selection factor as a function of the generated game outcome, randomly selecting at least one special symbol as a function of the symbol selection factor, and displaying the game outcome including the selected special symbol displayed in the special symbol position.

In another aspect of the present invention, a gaming machine is provided. The gaming machine includes a display device for displaying a game, a user input device configured to generate a signal indicative of a player's selection input, and a controller for displaying the game including a plurality of reels displayed in a display area. Each reel includes a reel strip including a plurality of normal symbols positions and a plurality of special symbol positions. The controller randomly generates an outcome of the game and displays the game outcome on the display device, wherein the game outcome including at least one special symbol position being displayed on at least one reel of the plurality of reels in the display area. The controller also determines a symbol selection factor as a function of the generated game outcome, randomly selects at least one special symbol from a predefined set of special symbols as a function of the symbol selection factor, and displays the game outcome including the selected special symbol displayed in the special symbol position.

In yet another aspect of the present invention, a system is provided. The system includes a plurality of gaming devices and a system controller coupled to each gaming device. Each gaming device includes a user input device for accepting a player's selection input and a display device. The system controller displays a game on at least one gaming device, wherein the game includes a plurality of reels displayed in a display area. Each reel includes a reel strip including a plurality of normal symbols positions and a plurality of special symbol positions. The system controller randomly generates an outcome of the game and displays the game outcome on the display device, wherein the game outcome including at least one special symbol position being displayed on at least one reel of the plurality of reels in the display area. The system controller determines a symbol selection factor as a function of the generated game outcome, randomly selects at least one special symbol as a function of the symbol selection factor, and displays the game outcome including the selected special symbol displayed in the special symbol position.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE PREFERRED EMBODIMENT

Figure 1:
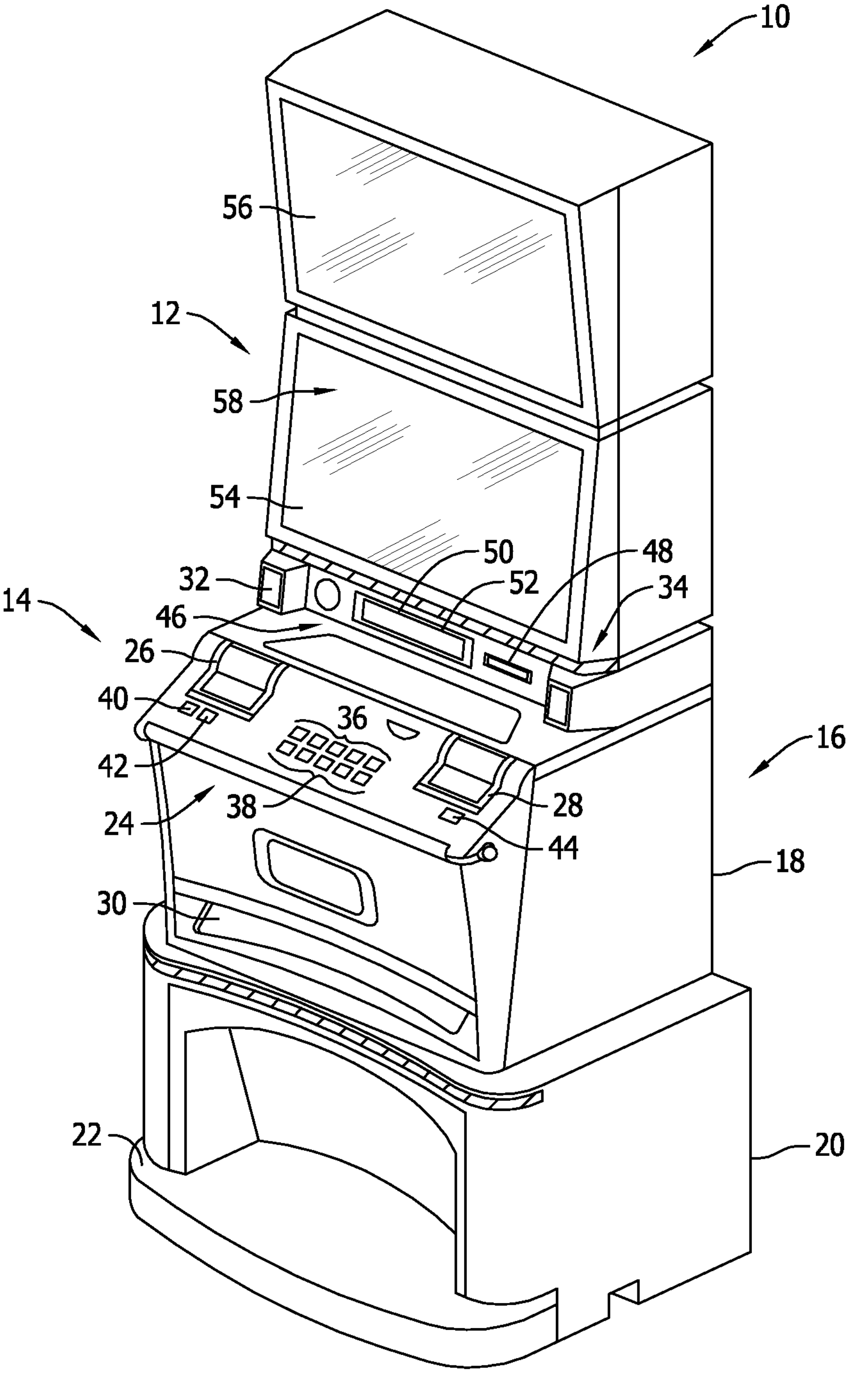
FIG. 1 is a perspective view of an exemplary gaming machine of the present invention.

With reference to the drawings and in operation, the present invention overcomes at least some of the disadvantages of known gaming machines by providing a gaming machine that displays a game including a reel having a plurality of special symbol positions, generates an outcome, and randomly selects a special symbol to be displayed in the special symbol positions in the outcome. The gaming machine also determines a symbol selection factor as a function the game outcome and selects the special symbol based on the symbol selection factor. Moreover, the gaming machine determines a number of special symbol positions displayed in the outcome and selects the special symbol as a function of the displayed number of special symbol positions. More specifically, the gaming machine determines a probability of selecting a special symbol from a predefined set of special symbols based on the number of displayed special symbol positions. By providing a gaming machine that determines a probability of selecting a special symbol based on the number of special symbol positions displayed in the outcome, the player's expectation for achieving a win is increased and the enjoyment of the game is improved. Thus, the amount of time that the game is played by patrons of a gaming establishment is thereby increased.

In general, the gaming machine 10 allows a player to initiate a gaming session to play a plurality of video slot games via the gaming machine 10. The gaming machine 10 displays a game, accepts a wager on the game, generates a game outcome including a plurality of symbols displayed in a plurality of symbol positions, and provides an award to the player if a winning combination is displayed in the generated game outcome. During play of the game, the gaming machine 10 displays at least one reel having a reel strip that includes a plurality of special symbol positions and a plurality of normal symbol positions. The gaming machine 10 randomly generates a game outcome, spins and stops the reel to display the generated first game outcome, and provides an award to the player if a winning combination appears in the game outcome. The gaming machine 10 determines if at least one special symbol position is displayed in the game outcome and determines a symbol selection factor as a function of the game outcome. The gaming machine 10 also randomly selects a special symbol to be displayed in the special symbol positions based on the symbol selection factor, and displays the selected special symbol in each displayed special symbol position in the game outcome. The gaming machine 10 evaluates the outcome including the displayed special symbols and provides an award to the player based on the game outcome.

In the illustrated embodiment, the special symbol is randomly selected from a predefined set of special symbols. Each special symbol includes an associated probability of selection that is determined as a function of the symbol selection factor. Moreover, the symbol selection factor is determined as a function of the number of special symbol positions that are displayed in the game outcome. During game play, the gaming machine 10 determines the number of special symbols positions displayed in the game outcome and determines the symbol selection factor based on the number of displayed special symbol positions. The gaming machine 10 then selects the special symbol to be displayed in the special symbol positions based on the selection probabilities associated with the symbol selection factor. In one embodiment, a higher value special symbol has a higher probability of selection if the symbol selection factor includes a relatively low number of special symbol positions being displayed in the game outcome. Moreover, a lower value special symbol has a lower probability of selection with a relatively low number of special symbol positions being displayed in the game outcome. In addition, the higher value special symbol has a lower probability of selection if the symbol selection factor includes a relatively high number of special symbol positions being displayed in the game outcome, and the lower value special symbol has a higher probability of selection associated with the high number of displayed special symbol positions. Thus, a game outcome that includes a relatively low number of special symbol positions has a higher probability of a high value special symbol appearing in the outcome.

In one embodiment, the symbol selection factor may be determined as a function of the player's wager, wherein the special symbol probability of selection is determined as function of the amount of the player's wager. In addition, in another embodiment, the symbol selection factor may be determined as a function of the player's status such as, for example, a player ranking, such that the special symbol probability of selection may be determined as a function of the player's ranking.

Because the gaming machine 10 replaces the symbols in each of the special symbol positions displayed in a game outcome, and randomly selects the special symbol based on a probability of selection determined as a function of a symbol selection factor, the player's anticipation of a winning outcome is increased, thus increasing the period of time the gaming machine 10 is played by the player.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 2:
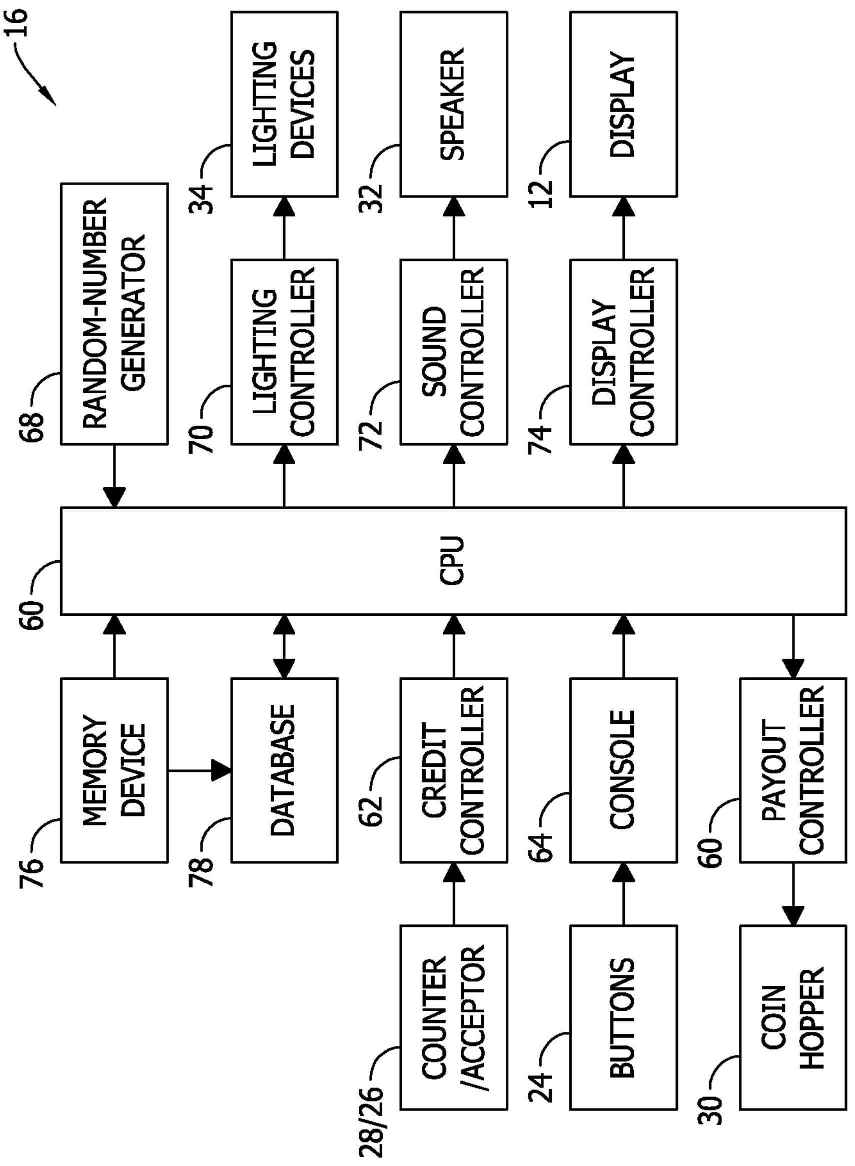
FIG. 2 is a schematic representation of the gaming machine shown in FIG. 1.

FIG. 1 is a perspective view of an exemplary gaming machine 10. FIG. 2 is a schematic representation of the gaming machine 10. A preferred embodiment of the present invention is a video gaming machine preferably installed in a casino. In the illustrated embodiment, the gaming machine 10 includes a display device 12 for displaying a plurality of games, a user input device 14 to enable a player to interface with the gaming machine 10, and a gaming controller 16 that is operatively coupled to the display device 12 and the user input device 14 to enable a player to play games displayed on the display device 12. The gaming machine 10 also includes a cabinet assembly 18 that is configured to support the display device 12, the user input device 14, and/or the gaming controller 16 from a gaming stand 20 and/or a supporting surface 22.

The display device 12 and the user input device 14 are each coupled to the cabinet assembly 18 and are each accessible by the player. In one embodiment, the gaming controller 16 is positioned within the cabinet assembly 18. Alternatively, the gaming controller 16 may be separated from the cabinet assembly 18, and connected to components of the gaming machine 10 through a network such as, for example, a local area network (LAN), a wide area network (WAN), dial-in-connections, cable modems, wireless modems, and/or special high-speed Integrated Services Digital Network (ISDN) lines.

In one embodiment, the user input device 14 includes a plurality of input buttons 24, a coin slot 26, and/or a bill acceptor 28. The coin slot 26 includes an opening that is configured to receive coins and/or tokens deposited by the player into the gaming machine 10. The gaming machine 10 converts a value of the coins and/or tokens to a corresponding amount of gaming credits that are used by the player to wager on games played on the gaming machine 10.

The bill acceptor 28 includes an input and output device that is configured to accept a bill, a ticket, and/or a cash card into the bill acceptor 28 to enable an amount of gaming credits associated with a monetary value of the bills, ticket, and/or cash card to be credited to the gaming machine 10. Moreover, the gaming machine 10 may also utilize a cashless wagering system (not shown), such as a ticket in ticket out (TITO) system (not shown). In one embodiment, the bill acceptor 28 also includes a printer (not shown) that is configured to dispense a printed voucher ticket that includes information indicative of an amount of credits and/or money paid out to the player by the gaming machine 10 during a gaming session. The voucher ticket may be used at other gaming machines, or redeemed for cash, and/or other items as part of a casino cashless system (not shown).

A coin tray 30 is coupled to the cabinet assembly 18 and is configured to receive a plurality of coins that are dispensed from the gaming machine 10. One or more speakers 32 are installed inside the cabinet assembly 18 to generate voice announcements and/or sound effects associated with game play. The gaming machine 10 also includes one or more lighting devices 34 that are configured to blink and/or change brightness and color in specific patterns to produce lighting effects to enhance a visual gaming experience for the player.

In one embodiment, the input buttons 24 include a plurality of BET switches 36 for inputting a wager on a game, a plurality of selection switches 38 for selecting a betting line and/or card, a MAXBET switch 40 for inputting a maximum wager, a PAYOUT switch 42 for ending a gaming session and dispensing accumulated gaming credits to the player, and a start switch, i.e., a SPIN/DEAL button 44 to initiate an output of a game.

In the illustrated embodiment, the BET switches 36 include five switches from 1BET to 5BET to enable a player to wager between a minimum bet up to 5× minimum bet. Each selection switch 38 corresponds to a betting line such as, for example, a payline and/or symbol for a reel game, one or more cards for a card game, and/or a symbol for a roulette game, to enable a player to associate a wager with one or more betting lines. The MAXBET switch 40 enables a player to input the maximum bet that a player can spend against one time of a game. The PAYOUT switch 42 enables a player to receive the amount of money and/or credits awarded to the player during a gaming session, which has been credited onto the gaming machine 10.

The gaming machine 10 also includes a player tracking device 46 that is coupled to the gaming controller 16 for identifying the player and/or a player tracking account that is associated with the player. The player tracking account may include, but is not limited to, gaming credits available to the player for use in playing the gaming machine 10. The player tracking device 46 is configured to communicate player account information between a player tracking controller (not shown) and the gaming machine 10. For example, the player tracking device 46 may be used to track bonus points and/or credits awarded to the player during a gaming session and/or track bonus and/or credits downloaded to the gaming machine 10 from the player tracking system. In the illustrated embodiment, the player tracking controller assigns a player status, e.g. a player ranking, based on the player account information. For example, the player tacking information may include, but is not limited to, a frequency in which the player plays a game, the average wager the player makes per play of a game, a total amount wagered by the player over a predefined period of time, and/or any other suitable player tracking information. In addition, the player tracking controller may assign a player a higher player ranking based on a high average wager and/or a high total wager amount as compared with other tracked players. The gaming machine 10 may receive the player tracking information from the player tracking controller and determine the symbol selection factor based at least in part on the received player tracking information associated with the current player.

The player tracking device 46 is coupled to the gaming cabinet assembly 18 and includes a player identification card reader 48, a data display 50, and a keypad 52. The player identification card reader 48 is configured to accept a player tracking card (not shown) inserted by the player, and read information contained on the player tracking card to identify the player account information. The player identification card reader 48 may include, but is not limited to, a barcode reader, a magnetic card reader, and/or a radio frequency identification (RFID) card reader. The keypad 52 is configured to accept a user selection input such as, for example, a unique player personal identification number (PIN) to facilitate enabling the gaming machine 10 to identify the player, and access player account information associated with the identified player to be displayed on the data display 50. In one embodiment, the data display 50 includes a touchscreen panel that includes the keypad 52. Alternatively, the data display 50 and the keypad 52 may be included in the display device 12.

In one embodiment, the display device 12 includes a first display 54 and a second display 56. The first display 54 is configured to display a game screen 58 (shown in FIG. 3) including indicia and/or symbols for use in a game, e.g., cards used by a card game, roulette wheel and symbols used in a roulette game, and reels used in a reel game. The game screen 58 may include any type of game including, but not limited to, a video slot game, a keno game, a blackjack game, a video poker game, or any type of game which allows a player to make a wager, play a game, and potentially provide the player an award based on an outcome of the game and a paytable. The second display 56 is configured to display game play instructions for performing the game including, but not limited to, playing instructions, paytables, paylines, betting lines and/or any other information to enable the gaming machine 10 to function as described herein. Moreover, each display 54 and 56 may be configured to display at least a portion of the game screen 58 and/or game play instructions. In one embodiment, the first and second displays 54 and 56 each include a flat panel display, such as a cathode ray tube display (CRT), a liquid crystal display (LCD), a light-emitting diode display (LED), an organic light-emitting diode display (OLED), an active-matrix organic light-emitting diode display (AMOLED), a plasma display, and/or any suitable visual output device capable of displaying graphical data and/or text to a user. Alternatively, a single component, such as a touch screen, may function as both the display device 12 and as the user input device 14. In an alternative embodiment, the first display 54 and/or the second display 56 includes a plurality of mechanical reels displaying a plurality of game symbols.

Referring to FIG. 2, in one embodiment, the gaming controller 16 includes a processor, i.e., a central processing unit (CPU) 60, a credit controller 62, a console unit 64, a payout controller 66, a random-number generator (RNG) 68, a lighting controller 70, a sound controller 72, a display controller 74, a memory device 76, and a database 78. Memory device 76 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 60 to store, retrieve, and/or execute instructions and/or data.

The CPU 60 executes various programs, and thereby controls other components of the gaming controller 16 according to player instructions and data accepted by the user input device 14. The CPU 60 in particular executes a game program, and thereby conducts a game in accordance with the embodiments described herein. The memory device 76 stores programs and databases used by the CPU 60. Moreover, the memory device 76 stores and retrieves information in the database 78 including, but not limited to, wagers, wager amounts, average wagers per game, a game type, a number of reels associated with a game, a number of reel strips associated with each reel, a number of symbol positions being displayed on each reel strip, a type of symbols being displayed with each symbol position, a predefined set of normal symbols, a predefined set of special symbols, image data for producing game images and/or screens on the display device 12, and temporarily stores variables, parameters, and the like that are used by the CPU 60. In addition, the memory device 76 stores indicia, symbol weights, symbol values, selection probabilities tables which represent relationships between symbol selection probabilities and symbol selection factors, paytables, and/or winning combination tables which represent relationships between combinations of random numbers and types of awards. In one embodiment, the memory device 76 utilizes RAM to temporarily store programs and data necessary for the progress of the game, and EPROM to store, in advance, programs and data for controlling basic operation of the gaming machine 10, such as the booting operation thereof.

The credit controller 62 manages the amount of player's credits, which is equivalent to the amount of coins and bills counted and validated by the bill acceptor 28. The console unit 64 is coupled to the user input device 14 to monitor player selections received through the input buttons 24, and accept various instructions and data that a player enters through the input buttons 24. The payout controller 66 converts a player's credits to coins, bills, or other monetary data by using the coin tray 30 and/or for use in dispensing a credit voucher via the bill acceptor 28.

The lighting controller 70 controls one or more lighting devices 34 to blink and/or change brightness and color in specific patterns in order to produce lighting effects associated with game play. The sound controller 72 controls the speakers 32 to output voice announcements and sound effects during game play. The display controller 74 controls the display device 12 to display various images on screens preferably by using computer graphics and image data stored in the memory device 76. More specifically, the display controller 74 controls video reels in a game screen displayed on the first display 54 and/or the second display 56 by using computer graphics and the image data.

The RNG 68 generates and outputs random numbers to the CPU 60 preferably at the start of each round of a game. The CPU 60 uses the random numbers to determine an outcome of the games. For example, if the game is a video slot game, the CPU 60 uses the RNG 68 to randomly select an arrangement of symbols to be displayed on video reels. Moreover, the CPU 60 generally uses random numbers generated by the RNG 68 to play the games and to determine whether or not to provide an award to a player. In addition, the CPU 60 generates game outcomes including combinations of random numbers, and compares the generated combinations with winning combinations stored in the winning combination table to determine if the generated outcome is a winning outcome that is associated with a type of award.

Figure 3:
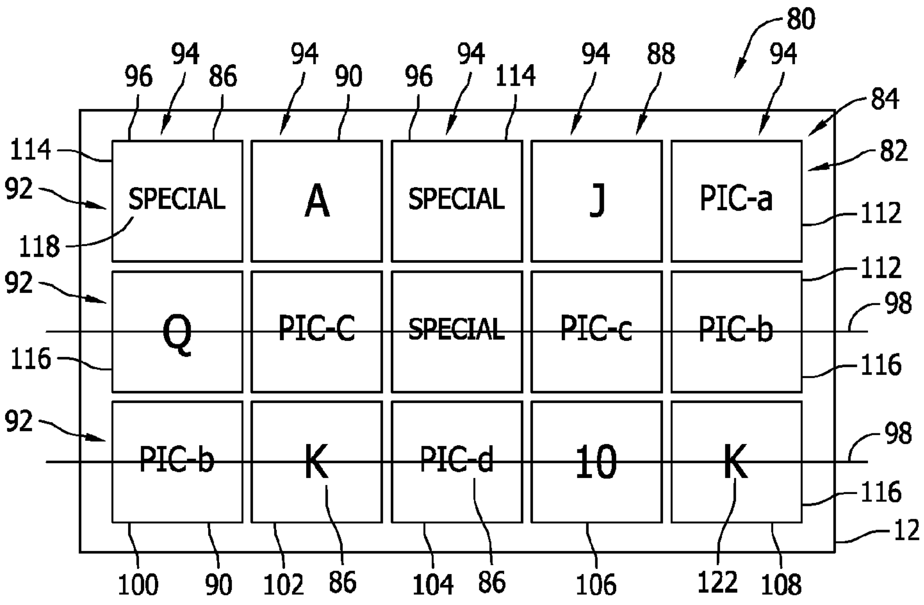
FIG. 3 is a graphical display of a video slot game, according to an embodiment of the present invention.
Figure 4:
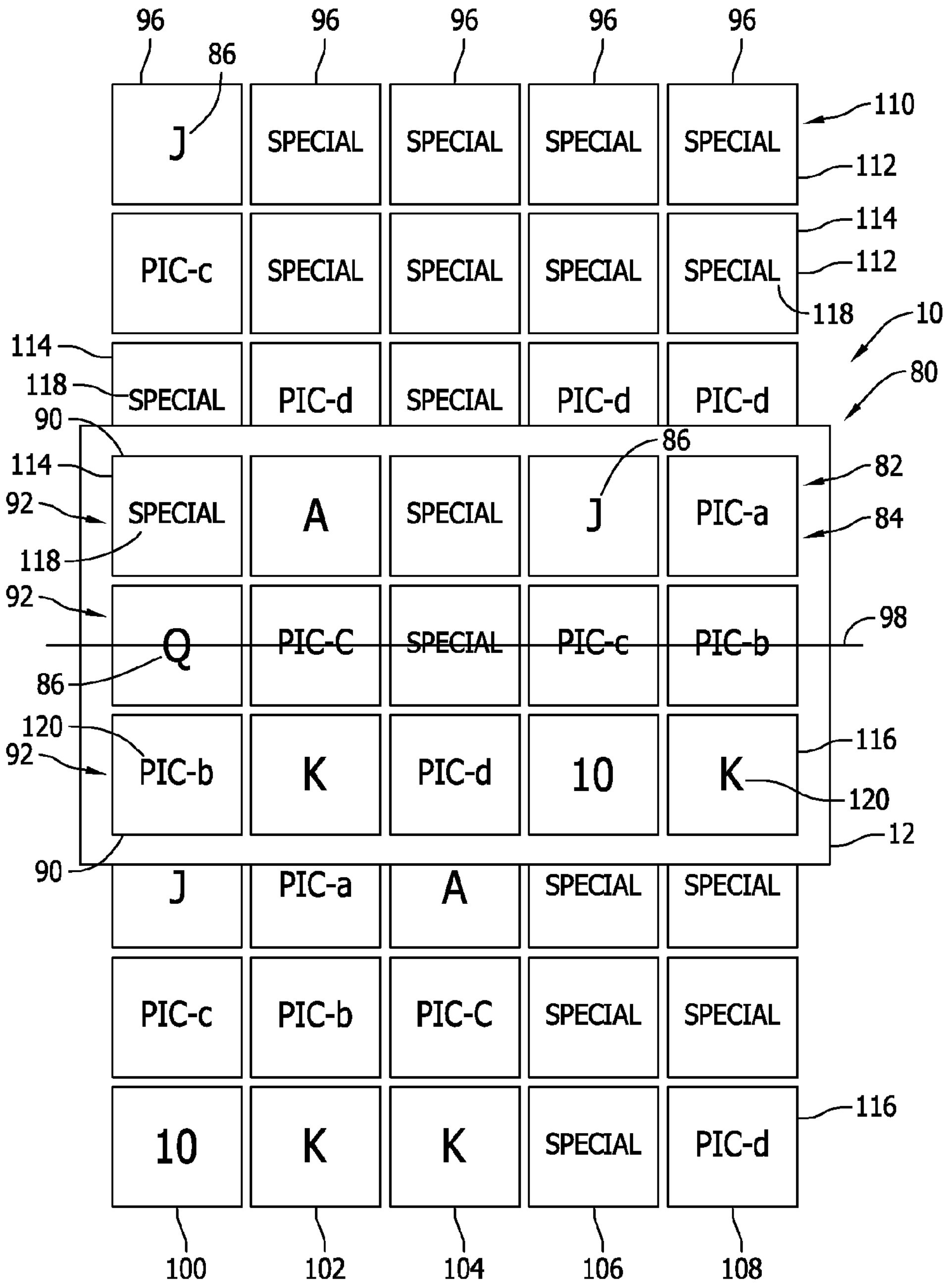
FIG. 4 is a schematic representation of a portion of the gaming machine shown in FIG. 1 including the video slot game of FIG. 3 illustrating a plurality of slot reels, according to an embodiment of the present invention.

FIG. 3 is an exemplary graphical display of a game 80 that is displayed by the gaming machine 10. FIG. 4 is a schematic representation of a portion of the gaming machine 10 including the game 80. In the illustrated embodiment, the gaming controller 16 is configured to display the game 80 on the display device 12. In one embodiment, the game 80 is a video slot game. However, it should be noted that the game 80 may be any type of game upon which a player could make a wager including, but not limited to a keno game, a blackjack game, a video poker game, or any type of game that enables the gaming controller 16 to function as described herein. In the illustrated embodiment, the game 80 is displayed on the first display 54. Alternatively, the game 80 may be displayed on the first display 54 and/or the second display 56.

In general, during play of the game 80, the gaming controller 16 randomly generates an outcome 82 of the game 80 and displays the generated game outcome 82 in a display area 84. The gaming controller 16 randomly selects a plurality of game symbols 86 from a predefined set of possible game symbols and displays the selected game symbols 86 associated with the generated game outcome 82 in the game display area 84.

In the illustrated embodiment, the plurality of symbols 86 are displayed in a grid 88 having a plurality of cells 90 arranged along a plurality of rows 92 and a plurality of columns 94. Each cell 90 displays one or more game symbols 86 associated with the game outcome 82. In the illustrated embodiment, the gaming controller 16 displays the game symbols 86 within a plurality of reels 96. Each reel 96 is associated with a corresponding column 94. The game 80, in the illustrated embodiment, includes 5 reels 96 with 3 cells per reel, respectively (a "5×3" arrangement) displayed in the display area 84. Alternatively, other reel arrangements may be used such as, for example, 3-4-3-4-3, 4-5-5-5-4, or 4-5-4-5-4 arrangements or arrangements with the same number of cells per column, such as 3×3, 3×4, 4×5, or 5×5 configurations. The game 80 also includes a plurality of paylines 98 that extend across one or more cells 90 to indicate, to the player, a combination of game symbols 86. In one embodiment, the gaming machine 10 displays the game 80 via a plurality of mechanical reels (not shown) that include a plurality of symbols displayed on a circumferential surface of each reel.

Each slot game is generally played in a conventional manner. The player makes a wager, which may be based on a predetermined denomination and a selected number of paylines, the gaming controller 16 randomly generates an outcome for the game, spins the reels, and selectively stops the reels to display a game symbol 86 in each of the display cells 90. If a predetermined pattern of symbols 86 is randomly chosen for each cell 90 on a played payline 98, the player may be awarded a payout based on the payline, the wager, and a predetermined paytable. Moreover, the player may be awarded a payout if the combination of symbols associated with a selected payline is a winning combination. In addition, a player may receive a bonus feature and/or a bonus game based on the combination of symbols associated with the selected payline and/or the appearance of one or more predefined symbols in the game outcome 82. In the illustrated embodiment, each game symbol 86 has an associated symbol value such that the game 80 includes a plurality of game symbols 86 that each have a symbol value within a range of symbol values between a low symbol value and a high symbol value. The gaming controller 16 provides an award to the player that is determined as a function of the symbol values associated with each game symbol 86 included in a winning combination. Many variations to the above described general play of a slot game fall within the scope of the present invention. Such slot games are well-known in the art, and are therefore not further discussed.

In the illustrated embodiment, the gaming controller 16 receives a signal, from the user input device 14, that is indicative of a player's selection to initiate a gaming session including a wager amount, and a selection of one or more paylines 98 associated with a predefined set of cells 90 within the displayed grid 88. In the illustrated embodiment, the game 80 is a multi-line game, i.e., the paylines include horizontal paylines and/or diagonal pay-lines, and/or zig-zag paylines. Moreover, the user input device 14 may allow the player to toggle to increase the bet per payline a credit at a time (up to the maximum bet). The gaming controller 16 randomly generates an outcome 82 of the game 80, and displays the generated outcome 82 on the display device 12. In one embodiment, the gaming controller 16 is configured to rotate, and/or spin each reel 96 to initiate a game play, and stop each reel 96 to display a plurality of symbols 86 associated with the randomly generated outcome 82. In addition, the gaming controller 16 is adapted to determine if the generated outcome 82 is a winning outcome based on the displayed game symbols 86, a pay-table, a wager, and one or more player selected paylines 98. More specifically, the gaming controller 16 determines if a combination of symbols 86 arranged along the selected payline 98 is a winning combination. The gaming controller 16 may provide an award in response to the outcome 82 of the game 80. In general, the term "award" may be a payout, in terms of credits or money. Thus, the gaming controller 16 may award a regular payout in response to the outcome 82 of the game 80. However, it should be noted that the term award may also refer to other types of awards, including, prizes, e.g., meals, show tickets, etc. . . . , as well as in-game award, such as free games or awarding the player one or more wild symbols or stacked wild symbols in each of the games.

The gaming controller 16 is configured to display the game 80 including a plurality of reels 96. For example, in one embodiment, the gaming controller 16 displays the game 80 having five reels 96 orientated horizontally and including a 1$^{st}$ reel 100, a 2$^{nd}$ reel 102, a 3$^{rd}$ reel 104, a 4$^{th}$ reel 106, and a 5$^{th}$ reel 108. Each reel 96 includes one or more associated reel strips 110 (shown in FIGS. 9-11) that may be displayed on a respective reel 96. Each reel strip 110 includes a plurality of symbol positions 112 that each have a game symbol 86 displayed therein. During display of the generated game outcome 82, the gaming controller 16 spins each reel 96 such that the game symbols 86 are moved through each of the cells 90 in the display area 84.

In the illustrated embodiment, each reel 96 includes a reel strip 110 having a plurality of symbol positions 112 including a plurality of special symbol positions 114 (represented by the "special" mark shown in FIGS. 3-7) and a plurality of normal symbol positions 116. Moreover, the reel strip 110 includes at least one run of consecutive special symbol positions 114 that include a plurality of adjacent special symbol positions 114. During a round of the game 80, the gaming controller 16 randomly selects at least one special symbol 118 from a predefined set 120 (shown in FIG. 8) of special symbols 118, and displays the selected special symbol 118 in each special symbol position 114 such that each special symbol position 114 includes the selected special symbol 118. In the illustrated embodiment, the gaming controller 16 displays the same special symbol 118 in each special symbol position 114. Alternatively, the gaming controller 16 may select a plurality of similar special symbols 118 and/or a plurality of associated special symbols such as, for example, a set of special symbols included in a category of special symbols, for display in each special symbol position 114. For example, the predefined set 120 of special symbols may include, but is not limited to, a category of special symbols such as, for example, shapes, colors, sounds, items, characters, backgrounds, frames, and/or any category of special symbols that enable the gaming controller 16 to function as described herein. Each special symbol category includes a plurality of special symbols having predefined characteristics associated with the special symbol category. For example, the predefined set 120 of special symbols may include a shape category that includes a plurality of special symbols that each have a shape associated with the shape category. The gaming controller 16 may select one or more special symbols indicative of the shapes within the shape category, and display the selected special symbols in each of the special symbol positions 114.

In the illustrated embodiment, each reel strip 110 also includes a plurality of normal symbols 122 (represented by the "PIC-a", "PIC-b", "PIC-c", "PIC-d", "A", "K", "Q", "J", and "10" symbol marks shown in FIGS. 3-7) that are displayed in each normal symbol position 116. In the illustrated embodiment, the normal symbols 122 are static symbols wherein each normal symbol 122 appears in the associated normal symbol position 116 for each round of the game 80. Alternatively, the gaming controller 16 may randomly select a plurality of normal symbols 122 from a predefined set of normal symbols 122, and display the selected normal symbols 122 in each of the normal symbol positions 116. In addition, the predefined set of normal symbols 122 may include any game symbol not included in the predefined set 120 of special symbols 118.

Figure 5:
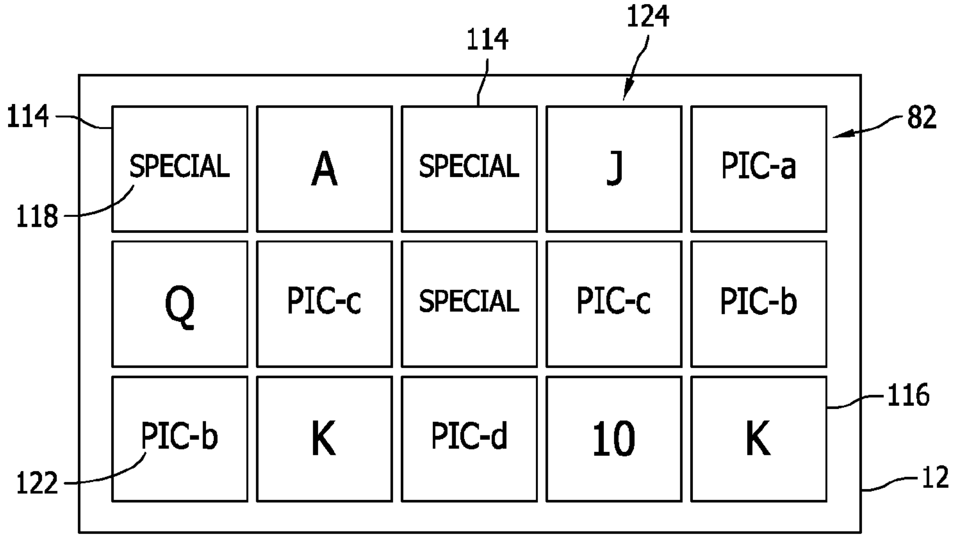
FIG. 5 is a second graphical display of the slot game of FIG. 3 showing a game outcome including a first number of special symbol positions, according to an embodiment of the present invention.
Figure 6:
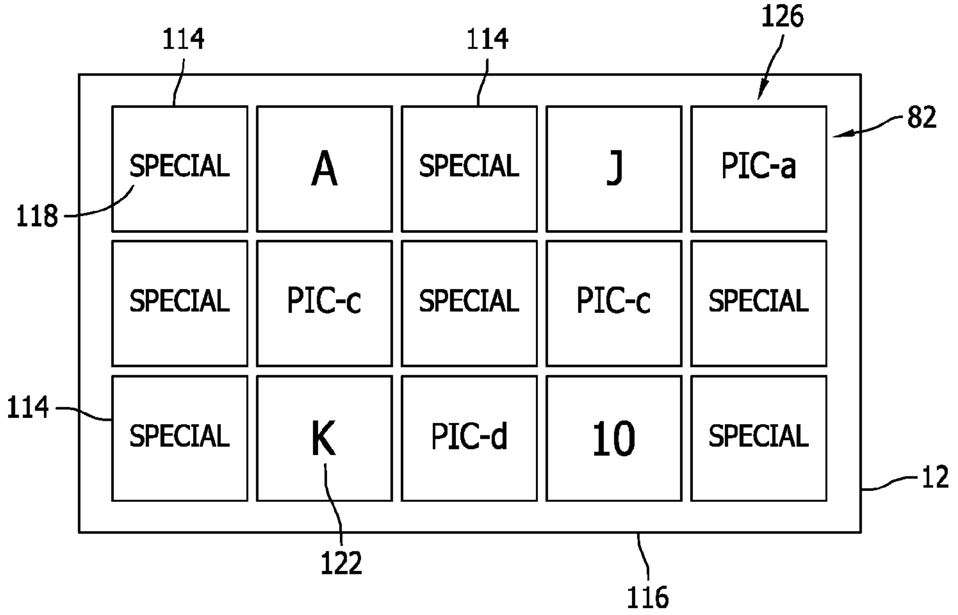
FIG. 6 is a third graphical display of the slot game of FIG. 3 showing the game outcome including a second number of special symbol positions, according to an embodiment of the present invention.
Figure 7:
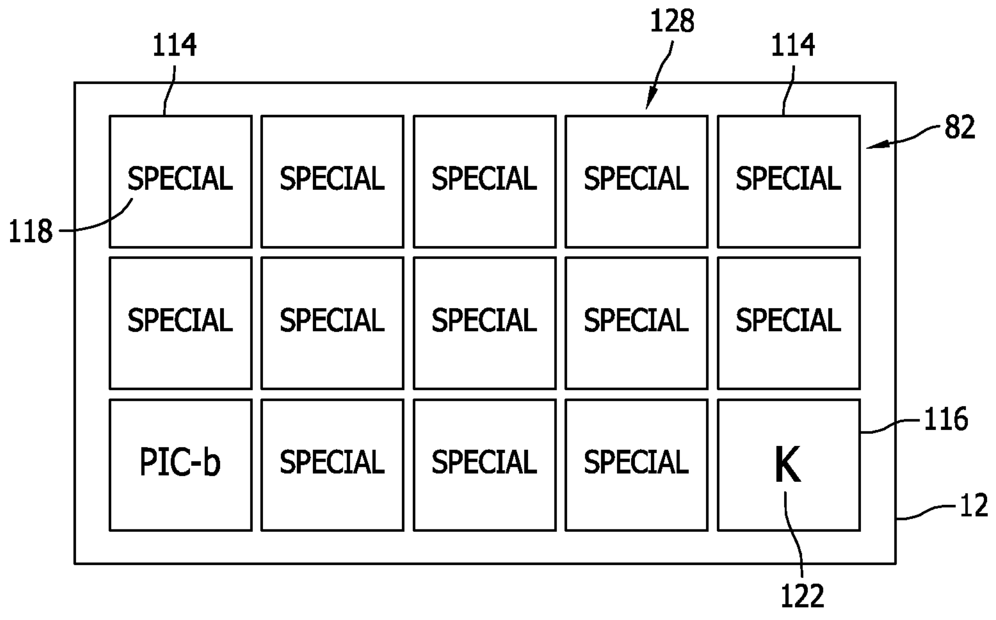
FIG. 7 is a fourth graphical display of the slot game of FIG. 3 showing the game outcome including a third number of special symbol positions, according to an embodiment of the present invention.
Figure 8:
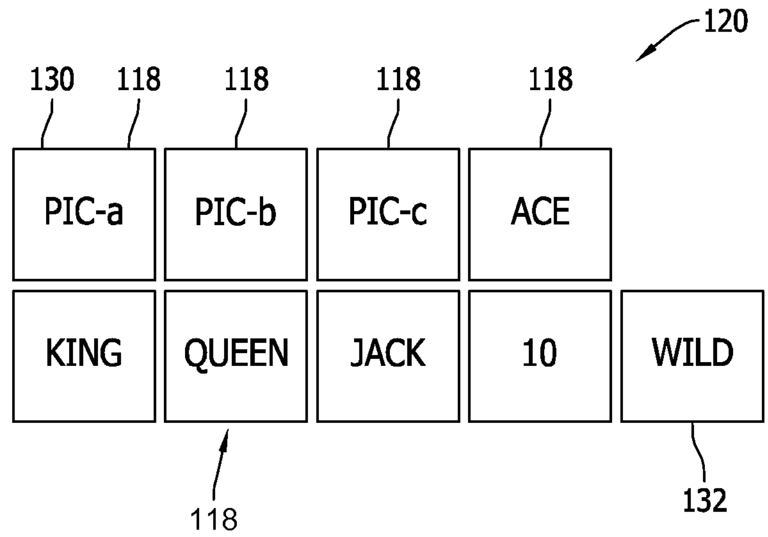
FIG. 8 is an illustration of a predefined set of special symbols, according to an embodiment of the present invention.

FIG. 5 is a graphical display of the game outcome 82 including a first number 124 of special symbol positions 114. FIG. 6 is a graphical display of the game outcome 82 including a second number 126 of special symbol positions 114. FIG. 7 is a graphical display of the game outcome 82 including a third number 128 of special symbol positions 114. FIG. 8 is an illustration of a predefined set 120 of special symbols 118. During game play, the gaming controller 16 randomly generates the game outcome 82 and displays the game outcome 82 on the display device 12. More specifically, the gaming controller 16 spins and stops each of the reels 96 to display the game outcome 82 in the display area 84. In the illustrated embodiment, the game outcome 82 includes at least one special symbol position 114 that is displayed in at least one reel 96 within the display area 84. The gaming controller 16 determines a symbol selection factor as a function of the generated game outcome 82 and randomly selects at least one special symbol 118 to be displayed in the at least one special symbol position 114 that is determined as a function of the symbol selection factor. The gaming machine 10 also displays the game outcome 82 including the selected special symbol 118 being displayed in the special symbol position 114. In the illustrated embodiment, during display of the game outcome 82 the gaming controller 16 replaces each symbol 86 displayed in the special symbol positions 114 with the selected special symbol 118 while the reels 96 are spinning such that the symbol replacement is visible to the player. Alternatively, the gaming controller 16 may replace each symbol 86 displayed in the special symbol positions 114 with the selected special symbol 118 before the reels 96 are spun, or after one or more reels 96 has stopped.

In the illustrated embodiment, the predefined set 120 of special symbols 118 includes a plurality of special symbols 118, wherein each special symbol 118 has an associated symbol value. The gaming controller 16 may provide an award based on the symbol values of the special symbol 118 being displayed in the game outcome. For example, if the game outcome 82 includes a winning combination that includes a special symbol 118 having a relatively high symbol value, the award provided to the player based on the winning combination includes an award value that is greater than an award value for a winning combination including a special symbol 118 having a lower symbol value. Thus, if the game outcome 82 includes special symbols 118 having relatively high symbols values, the players expectation of receiving a higher value award is increased. For example, in one embodiment, the predefined set 120 of special symbols 118 may include a PIC-a special symbol, a PIC-b special symbol, a PIC-c special symbol, an "Ace" special symbol, a "King" special symbol, a "Queen" special symbol, a "Jack" special symbol, a "10" special symbol, a "WILD" special symbol and/or any suitable symbol that may represent a special symbol 118. Each special symbol 118 includes a relative symbol value, for example, PIC-a, PIC-b, and PIC-c each have a low symbol value, and the "Ace", "King", "Queen", "Jack", "10", and "WILD" have a high symbol value that is greater than the values associated with PIC-a, PIC-b, and PIC-c. In addition, each special symbol 118 includes a probability of selection that is determined as a function of the symbol selection factor. For example, during game play, the gaming controller 16 determines the symbol selection factor based at least in part on the game outcome 82 and determines the probability of selection for each special symbol as a function of the symbol selection factor, and randomly selects a special symbol 118 based on the associated probabilities of selection.

In the illustrated embodiment, the gaming controller 16 determines the symbol selection factor as a function of a number of special symbol positions 114 being displayed in the game outcome 82. Moreover, the gaming controller 16 determines the probability of selection for each special symbol 118 based on the number of special symbol positions 114 displayed in the outcome 82. For example, FIG. 5 illustrates the game outcome 82 including a first number 124 of special symbol positions 114 being displayed in the display area 84, FIG. 6 illustrates the second game outcome 82 including a second number 126 of special symbol positions 114 displayed in the display area 84 that is greater than the first number 124 of special symbol positions 114, and FIG. 7 illustrates the game outcome 82 including a third number 128 of special symbol positions 114 displayed in the display area 84 that is larger than the second number 126 of special symbol positions 114. In the illustrated embodiment, each special symbol 118 includes a first selection probability associated with the first number 124 of special symbol positions 114 being displayed in the game outcome 82, a second selection probability associated with the second number 126 of special symbol positions 114 being displayed in the game outcome 82, and a third selection probability associated with the third number 128 of special symbol positions 114 displayed in the game outcome 82.

During game play, the gaming controller 16 determines the number of special symbol positions 114 being displayed in the display area 84, determines, for each special symbol 118 in the predefined set 120 of special symbols 118, the selection probability associated with the displayed number of special symbol positions 114, and randomly selects a special symbol 118 for display in the special symbol positions 114 based on the determined selection probabilities. In the illustrated embodiment, for each special symbol 118, the first, second, and third selection probabilities are different. Alternatively, for at least one special symbol 118, the first, second, and third selection probabilities may be approximately equal. For example, in one embodiment, the predefined set 120 of special symbols 118 includes a first special symbol 130 having a low symbol value, i.e. the PIC-a special symbol, and a second special symbol 132 having a high symbol value, i.e. the "WILD" special symbol.

In the illustrated embodiment, the gaming controller 16 determines the first special symbol 130 to have a lower probability of selection if a low number of special symbol positions 114 are displayed in the game outcome 82, and to have a higher selection probability if a high number of special symbol positions 114 are displayed in the game outcome 82. Moreover, the gaming controller 16 determines the second special symbol 132 to have a higher selection probability associated with a lower number of displayed special symbol positions 114, and to have a lower selection probability associated with a high number of displayed special symbol positions 114. In addition, if the game outcome 82 includes the first number 124 of special symbol positions 114, the gaming controller 16 assigns a higher selection probability to the high value symbol 132 as compared to the low value symbol 130, and if the game outcome includes the third number 128 of special symbol positions, the gaming controller 16 assigns a higher selection probability to the low value symbol 130 as compared to the high value symbol 132. In addition, if the game outcome 82 includes the second number 126 of special symbol positions 114, the low value symbol 130 and the high value symbol 132 may each have approximately equal selection probabilities.

In the illustrated embodiment, the gaming controller 16 determines the symbol selection factor as a function of the number of special symbol positions 114 displayed in the game outcome 82. Moreover, the gaming controller 16 determines a relative percentage of symbol positions 112 that include a special symbol position 114 and determines the probability of selecting each special symbol 118 based on the determined percentage of special symbol positions 114 displayed in the game outcome 82. For example, the probability of selecting a special symbol 118 determined as a function of the percentage of special symbol positions 114 displayed in the game outcome 82 may be provided as in the following chart. The percentages listed in each of the following charts are for illustrative purposes only and do not limit the scope of the invention as described herein. For example, the probabilities associated with each special symbol 118 may include any suitable probability value to enable the gaming machine 10 to function as described herein.

| Percentage of Special Symbol Positions displayed in Game Outcome | Probability of Selecting a Special Symbol Relative Value of Special Symbols Low value PIC-a | → PIC-b | Med. value PIC-c | → K | High value WILD |
|---|---|---|---|---|---|
| Low % | 10% | 10% | 10% | 20% | 50% |
| ↓ | 10% | 15% | 15% | 20% | 40% |
| | 15% | 15% | 30% | 20% | 20% |
| Med. % | 20% | 20% | 20% | 20% | 20% |
| ↓ | 20% | 20% | 30% | 15% | 15% |
| | 40% | 20% | 15% | 15% | 10% |
| High % | 50% | 20% | 10% | 10% | 10% |

The first column represents the percentage of special symbol positions 114 displayed in the game outcome 82 determined as a function of the total number of symbol positions 112 displayed in the outcome 82. The second column represents the probability of selecting the PIC-a special symbol associated with each percentage of special symbol positions 114 displayed in the game outcome 82. The third, fourth, fifth, and sixth columns represent the probability of selecting the PIC-b, PIC-c, K, and WILD special symbols, respectively, associated with the corresponding percentage of displayed special symbol positions 114. In addition, the relative values associated with each special symbol 118 are displayed in each corresponding column. For example, the PIC-a special symbol has a relatively low symbol value, the PIC-c has a relatively medium symbol value, and the WILD special symbol has a relatively high symbol value. More specifically, the WILD special symbol has a symbol value that is greater than the PIC-c special symbol and the PIC-a special symbol, and the PIC-c special symbol has a symbol value that is greater than the PIC-a special symbol.

In the illustrated embodiment, the gaming controller 16 determines the number of special symbol positions 114 that are displayed in the game outcome 82, determines the probability of selection for each special symbol 118 based on the determined number of special symbol positions 114 displayed in the outcome 82, and selects the special symbol 118 based on the determined percentages. Moreover, the gaming controller 16 may also determine a percentage of symbol positions 112 including a special symbol position 114 and determine the probability of selecting each special symbol 118 based on the determined percentage of displayed special symbol positions 114.

In addition, in the illustrated embodiment, if the percentage of displayed special symbol positions 114 is relatively low, for example, the outcome 82 displays a number of special symbol positions 114 that is less than number of normal symbol positions 116, the special symbols 118 having a higher symbol value, e.g. the K special symbol, include a higher probability of selection than the special symbols having a lower symbol value, e.g. the PIC-a special symbol. Thus, the gaming controller 16 has a high probability of selecting a higher value special symbol than selecting a lower value special symbol. Moreover, if the percentage of displayed special symbol positions 114 is relatively high, for example the outcome 82 displays a number of special symbol positions 114 that is larger than the number of normal symbol positions 116, the probability of selecting a higher value special symbol, e.g. the WILD special symbol, is less than the probability of selecting a lower value special symbol, e.g. the PIC-a special symbol. Thus, the gaming controller 16 has a high probability of selecting a lower value special symbol than selecting a higher value special symbol. By providing a probability of selection based on a number of special symbol positions 114 displayed in the outcome 82, if the outcome 82 displays a relatively low percentage of special symbol positions 114, the gaming controller has a higher probability of selecting a special symbol having a relatively high symbol value. In addition, if the outcome 82 displays a relatively high percentage of special symbol positions 114, the gaming controller 16 has a higher probability of selecting a special symbol having a relatively low symbol value.

For example, if the gaming controller 16 determines the number of special symbol positions 114 displayed in the game outcome 82 to be a relatively low percentage of the total number of symbol positions 112 such as, for example, 10% of the total displayed symbol positions 112, the gaming controller 16 determines the probability of selecting the lower value special symbols PIC-a, PIC-b, and PIC-c to be approximately equal to 10%, respectively. In addition, the gaming controller 16 determines the probability of selecting the higher value K special symbol to be approximately equal to 20%, and the probability of selecting the high value WILD special symbol to be approximately equal to 50%. Moreover, if the gaming controller 16 determines the game outcome 82 to include a relatively high percentage of special symbol positions 114, e.g. 80%, the gaming controller 16 determines the probability of selecting the lower value symbols PIC-a, PIC-b, and PIC-c to be approximately equal to 50%, 40%, and 20%, respectively. In addition, the gaming controller 16 determines the probability of selecting each of the higher value symbols K and WILD to be approximately equal to 10%, respectively.

In one embodiment, the gaming controller 16 may determine the symbol selection factor as a function of the amount of the wager made by the player to initiate the game 80. Moreover, the gaming controller 16 determines an amount of the wager as compared to a range of wager amounts and determines the probability of selecting each special symbol 118 based on the relative amount of the wager within the range of wager amounts. In the illustrated embodiment, the gaming controller 16 assigns a first probability of selection to the special symbol 118 based on a first wager amount and assigns a second probability of selection based on a second wager amount that is different from the first wager amount. In addition, the gaming controller 16 may determine a wager history associated with the player and determine the symbol selection factor as a function of the player wager history. For example, the gaming controller 16 may assign the selection probability based on wager history associated with the player, or based on a total amount of wager made by the player over a predefined period of time. In one embodiment, the gaming controller 16 may determine an average wager made by the player based on each previous wager made by the player, and determine the current wager amount as a percentage of the player's average wager. In another embodiment, the gaming controller 16 may determine an average game wager associated with the game 80 based on each previous wager received by the gaming machine 10 over a predefined period of time, and determine the current wager amount as a percentage of the average game wager.

For example, the probability of selecting a special symbol 118 determined as a function of the player's wager on the game 80 may be provided as in the following chart.

| Current Wager as | Probability of Selecting a Special Symbol Relative Value of Special Symbols | | | | |
|---|---|---|---|---|---|
| a Percentage of Average Wager | Low value PIC-a | → PIC-b | Med. value PIC-c | → K | High value WILD |
| Below 50% | 50% | 20% | 10% | 10% | 10% |
| ↓ | 40% | 20% | 15% | 15% | 10% |
| | 20% | 20% | 30% | 15% | 15% |
| 100% | 20% | 20% | 20% | 20% | 20% |
| ↓ | 15% | 15% | 30% | 20% | 20% |
| | 10% | 15% | 15% | 20% | 40% |
| Above 120% | 10% | 10% | 10% | 20% | 50% |

The first column represents the amount of the player's wager associated with the game 80 as compared to the player's average wager and/or the average game wager. The second column represents the probability of selecting the PIC-a special symbol associated with each wager amount as a percentage of an average wager. The third, fourth, fifth, and sixth columns represent the probability of selecting the PIC-b, PIC-c, K, and WILD special symbols, respectively, associated with the corresponding wager amount as a percentage of an average wager. In addition, the relative values associated with each special symbol are displayed in each corresponding column.

In the illustrated embodiment, the gaming controller 16 receives the wager from the player and determines the relative value of the wager as a percentage of an average wager, and determines a probability of selection for each special symbol 118 based on the player's wager. For example, if the player's wager is determined to be less than 50% of the average wager, the gaming controller 16 determines the probability of selecting a low value special symbol, i.e. the PIC-a special symbol, to be greater than the probability of selecting a high value special symbol, i.e. the WILD symbol. Moreover, if the gaming controller 16 receives a relative high wager amount, e.g. a wager amount that is more than 120% of the average wager, the gaming controller 16 determines the probability of selecting the higher value WILD symbol to be greater than the probability of selecting the lower value PIC-a symbol. Thus, by wagering a relatively low amount, the player has a higher probability of a lower value special symbol being displayed in the special symbol positions 114 than a higher value symbol, and by wagering a higher amount the probability of selecting the higher value symbol is greater than the probability of selecting a lower value symbol.

In one embodiment, the gaming controller 16 may determine a player status associated with the player and determine the symbol selection factor based on the player's status. For example, the gaming controller 16 may assign each special symbol 118 a symbol selection probability based on the player status, such that a higher rated player has a high probability of displaying a high value special symbol in the game outcome 82, and lower rated player has a low probability of displaying the high value special symbol.

Figure 9:
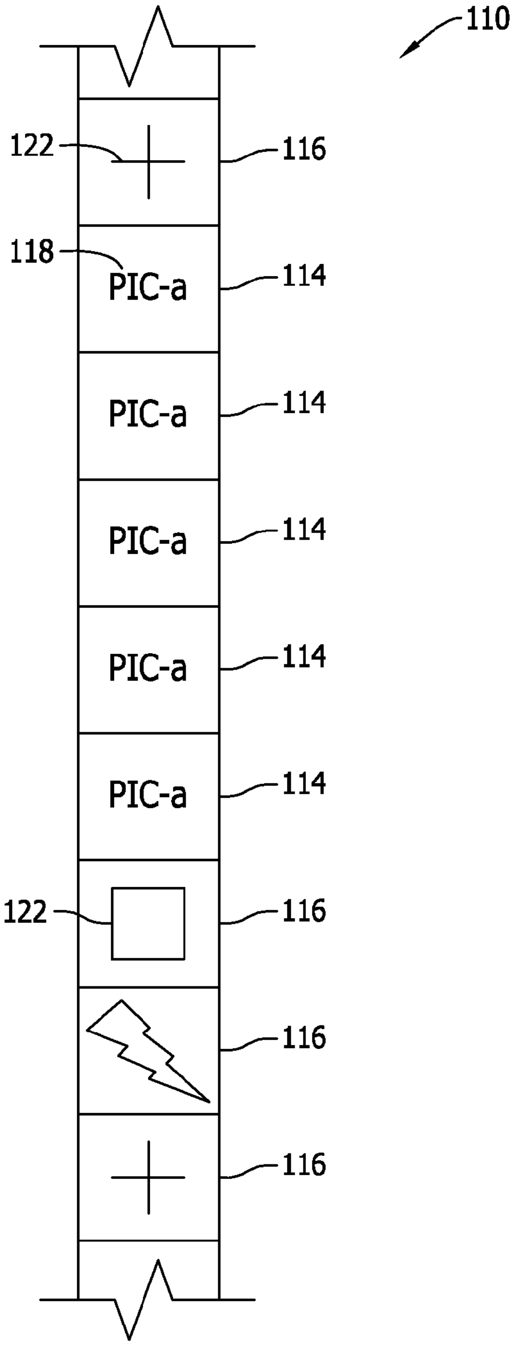
FIG. 9 is a schematic representation of a reel strip that may be used with at least one slot reel of the video slot game shown in FIGS. 3-7, according to an embodiment of the present invention.
Figure 10:
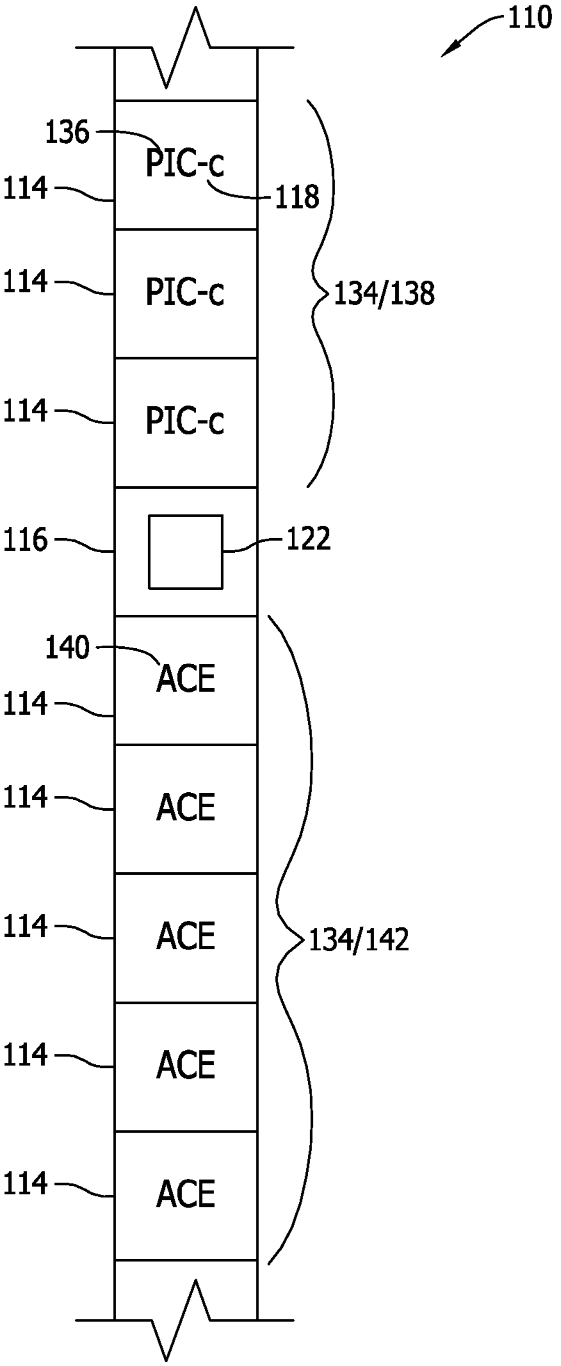
FIG. 10 is another schematic representation of the reel strip shown in FIG. 9, according to an embodiment of the present invention.
Figure 11:
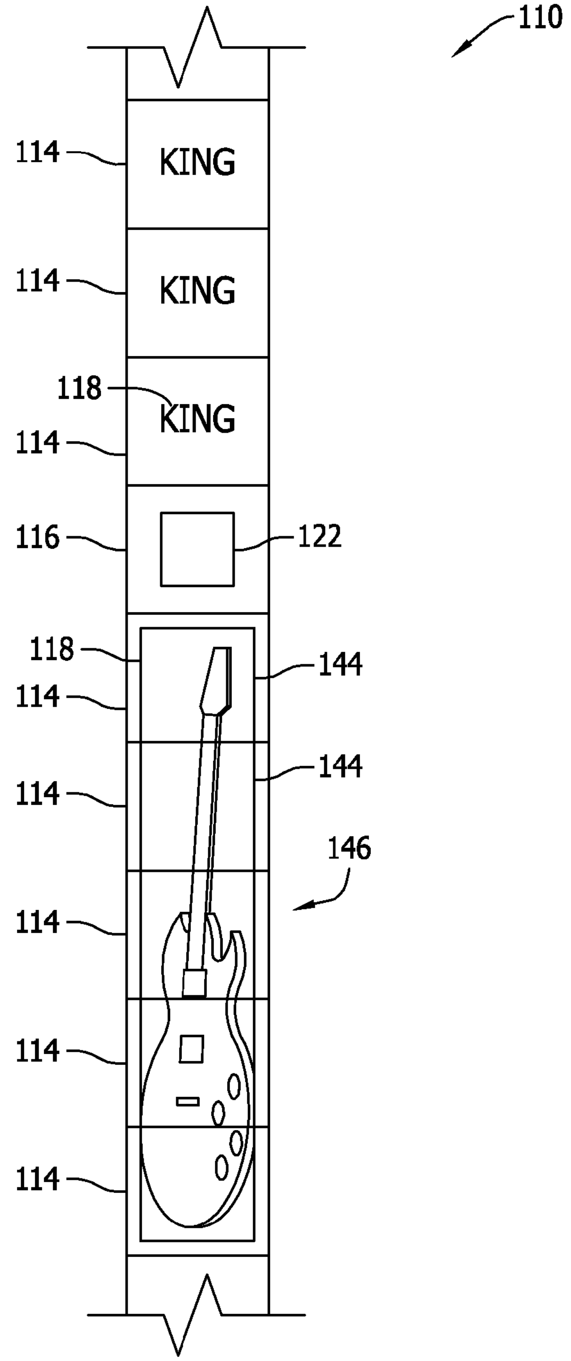
FIG. 11 is another schematic representation of the reel strip shown in FIG. 9, according to an embodiment of the present invention.

FIGS. 9-11 are schematic representations of a reel strip 110 that may be used with a slot reel 96. Referring to FIG. 9, in the illustrated embodiment, the reel strip 110 includes a plurality of adjacent special symbol positions 114 and a plurality of normal symbol position 116. Each normal symbol position 116 includes a static normal symbol 122. During each play of the game 80, the gaming controller randomly selects at least one special symbol 118 from the predefined set 120 of special symbols 118, and displays the selected special symbol 118 in each special symbol positions 114. Additional details of adjacent special symbol positions, which may be used in the present invention, are described in U.S. patent application Ser. No. 11/299,009 to Yoshimi, now U.S. Pat. No. 8,096,869, filed Dec. 9, 2005, titled "Gaming Machine with Runs of Consecutive Identical Symbols", which is incorporated herein by reference in its entirety.

Referring to FIG. 10, in one embodiment, the reel strip 110 may include a plurality of groups 134 of adjacent special symbol positions 114. For example, in one embodiment, the reel strip 110 may include at least two groups 134 of adjacent special symbol positions 114. During game play, the gaming controller 16 randomly selects a special symbol 118 and displays the selected special symbol 118 in each special symbol position 114 of the groups 134. Moreover, the reel strip 110 may include at least one normal symbol position 116 displayed between the groups 134 of adjacent special symbol positions 114.

In one embodiment, the gaming controller 16 may randomly select a different special symbol 118 to be displayed in each of the groups 134 and display a corresponding selected special symbol 118 in each special symbol position 114 of the associated group 134. For example, in one embodiment, the gaming controller 16 may select a first special symbol 136 to be displayed in a first group 138 of adjacent special symbol positions 114, and select a second special symbol 140 to be displayed in a second group 142 of special symbol position 114. In one embodiment, the first special symbol 136 and the second special symbol 140 are different. In another embodiment, the first special symbol 136 and the second special symbol 140 are similar. Moreover, the first and second special symbols 136 and 138 may be the same special symbol. In addition, the first and second special symbols 136 and 138 may be selected from the same category of special symbols and/or be selected from different categories of special symbols.

Referring to FIG. 11, in one embodiment, the gaming controller 16 may display a special symbol 118 having a plurality of symbol images 144 such that a plurality of adjacent special symbols 118 are displayed as a unitary image 146 that extends across the plurality of special symbol positions 114. For example, as shown in FIG. 10, the gaming controller 16 may randomly select a special symbol 118 to be displayed in each special symbol position 114 of a group 134, wherein the selected special symbol 118 includes a plurality of symbol images 144. Each selected special symbol 118 is displayed in each of the adjacent special symbol positions 114 with a different symbol image 144 such that a unitary symbol image 146 extends across each adjacent special symbol position 114.

In another embodiment, the gaming controller 16 may select a plurality of special symbols 118 from the same category of special symbols, wherein each selected special symbol 118 forms a portion of the unitary symbol image 146 such that when the selected special symbols 118 are displayed in each adjacent special symbol position 114, the unitary symbol image 146 is displayed across the adjacent special symbol positions 114.

Figure 12:
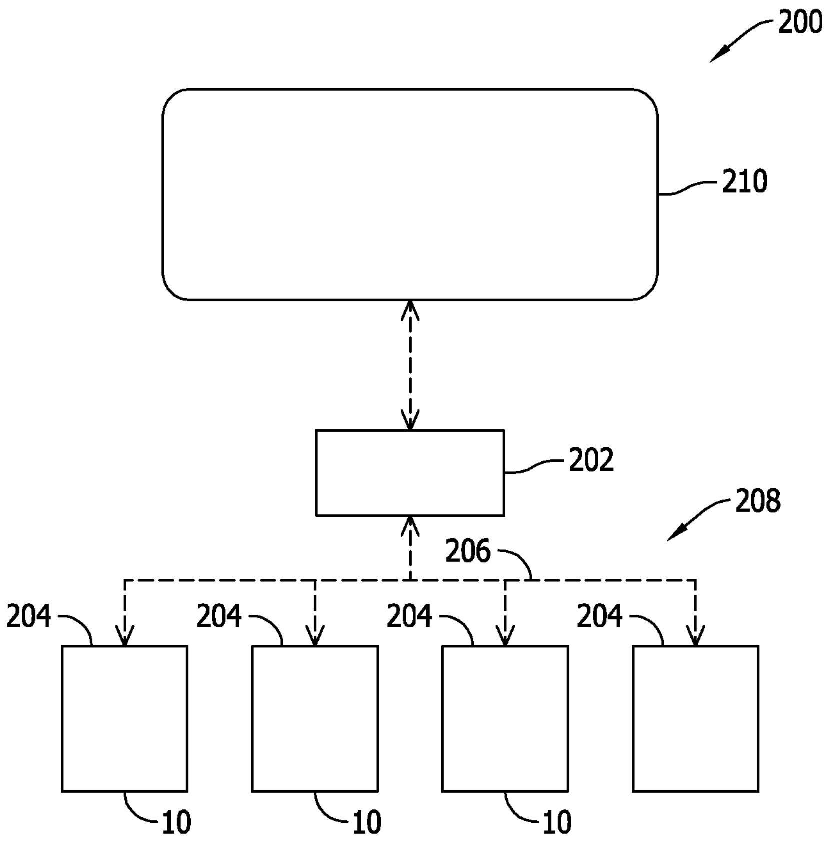
FIG. 12 is a schematic view of an exemplary gaming system of the present invention.

FIG. 12 is a schematic view of an exemplary gaming system 200. The gaming system 200 includes a system controller 202 and one or more gaming devices 204 that are coupled to the system controller 202. In one embodiment, the gaming device 204 includes the gaming machine 10. In another embodiment, gaming device 204 may include a personal computer, laptop, cell phone, smartphone, tablet computer, personal data assistant, and/or any suitable computing device that enables a player to connect to system controller 202 to play the game 80.

In the illustrated embodiment, the system controller 202 is configured to perform all of the functions of the gaming controller 16 as described herein. The system controller 202 communicates with each gaming device 204 for playing the game 80 on each gaming device 204 based on user selection input received from each gaming device 204. In the illustrated embodiment, the system controller 202 plays a separate instance of the game 80 on each gaming device 204 such that each player associated with the gaming devices 204 may play a separate instance of the game 80 simultaneously.

Referring to FIG. 3, in the illustrated embodiment, the system controller 202 displays the game 80 on at least one of the gaming devices 204. Moreover, the system controller 202 displays the game 80 including at least one reel 96 having a plurality of normal symbol positions 116 and a plurality of special symbol positions 114. During game play, the system controller 202 determines a number of special symbol positions 114 being displayed in the game outcome 82 and determines the symbol selection factor based at least in part on the number of displayed special symbol positions 114. The system controller 202 also determines a probability of selection associated with each special symbol 118 based on the symbol selection factor and randomly selects a special symbol 118 for display in each special symbol position 114 based on the determined symbol selection probabilities.

In the illustrated embodiment, the gaming machines 10 and the system controller 202 are coupled in communication with a local area network (LAN) 206. Alternatively, the gaming machines 10 and the system controller 202 may be coupled via a network such as, for example, an Internet link, an intranet, a WAN, dial-in-connections, cable modems, wireless modems, and/or ISDN lines. In the illustrated embodiment, the gaming system 200 includes four gaming machines 10, which in one embodiment as shown in FIG. 10 are arranged in a bank 208, i.e., are arranged together, adjacently. It should be noted, however, that the gaming system 200 may include any number of gaming machines 10 that may be arranged in any manner, such as in a circle or along a curved arc, or positioned within separate areas of a casino floor, and/or separate gaming establishments such as different casinos. Furthermore, additional groups of gaming machines 10 may be coupled to the system controller 202. In addition, in the illustrated embodiment, the gaming system 200 may also include a central display 210 that is coupled to the system controller 202 for displaying games played on one or more of the gaming machines 10.

In one embodiment, the system controller 202 may be implemented by one of the gaming controllers 16 associated with a gaming machine 10. In still another embodiment, the system controller 202 may be located remotely with respect to gaming machines 10, or within one of the gaming machine cabinet assemblies 18 (shown in FIG. 1).

In one embodiment, the system controller 202 may also determine if a bonus triggering event occurs in a game outcome being played at one or more of the gaming machines 10, and displays a bonus game such as, for example, the game 80 on the central display 210 if the bonus triggering event occurs. Alternatively, the system controller 202 may display the game 80 at one or more gaming machines 10 based on one or more bonus triggering events occurring in games played at the gaming machines 10. The bonus triggering event may be the appearance of a predefined symbol and/or a predefined symbol combination in a game outcome.

Figure 13:
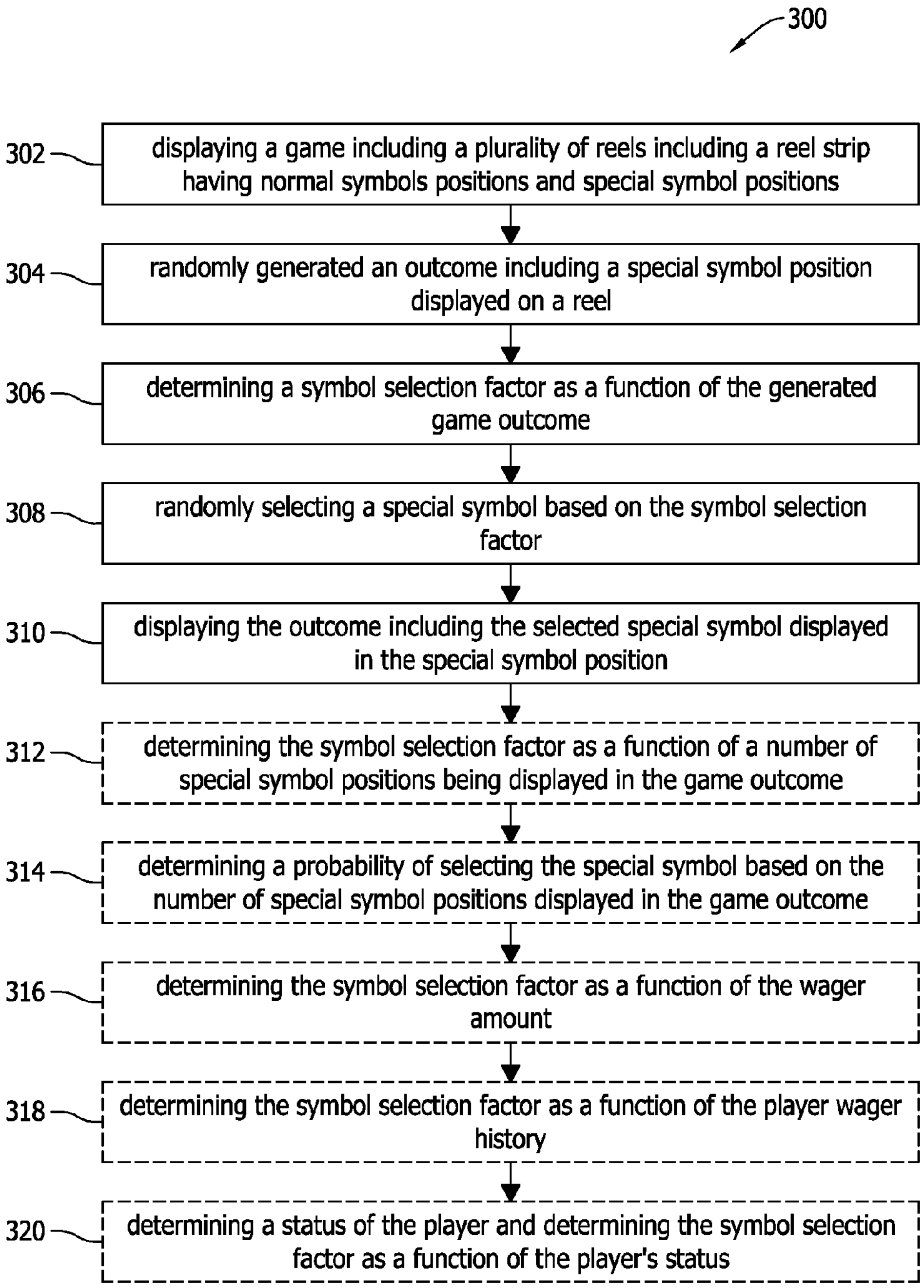
FIG. 13 is a flowchart of an exemplary method of allowing a player to play a gaming machine, according to an embodiment of the present invention.

FIG. 13 is a flowchart of an exemplary method 300 of allowing a player to play the gaming machine 10. In the illustrated embodiment, the method 300 includes displaying 302 a game including a plurality of reels, with each reel including a reel strip including a plurality of normal symbols positions and a plurality of special symbol positions. An outcome of the game is randomly generated 304 including at least one special symbol position being displayed on at least one of the reels. The method includes determining 306 a symbol selection factor as a function of the generated game outcome, randomly selecting 308 a special symbol as a function of the symbol selection factor, and displaying 310 the game outcome including the selected special symbol displayed in the special symbol position.

In one embodiment, the method may also include determining 312 the symbol selection factor as a function of a number of special symbol positions being displayed in the game outcome, and determining 314 a probability of selecting the special symbol based on the number of special symbol positions displayed in the game outcome. In another embodiment, the method 300 may include receiving 316 a wager amount from the player and determining the symbol selection factor as a function of the wager amount. In addition, in one embodiment, the method 300 may include determining 318 the symbol selection factor as a function of the player wager history. Moreover, in another embodiment, the method 300 may include determining 320 a status of the player and determining the symbol selection factor as a function of the player's status.

An exemplary technical effect of the methods, systems, and apparatus described herein includes at least one of (a) displaying, on a display device, a game including a plurality of reels displayed in a display area, wherein each reel of the plurality of reels including a reel strip including a plurality of normal symbols positions and a plurality of special symbol positions; (b) randomly generating an outcome of the game and displaying the game outcome on the display device, wherein the game outcome including at least one special symbol position being displayed on at least one reel of the plurality of reels in the display area; (c) determining a symbol selection factor as a function of the generated game outcome; (d) randomly selecting at least one special symbol from a predefined set 120 of special symbols, the symbol selection being determined as a function of the symbol selection factor; and (e) displaying the game outcome including the selected special symbol displayed in the at least one special symbol position.

The above-described system, apparatus, and methods overcome at least some disadvantages of known gaming machines by providing a gaming machine that displays a game outcome including a plurality of special symbol positions, determines a symbol selection factor as a function of the outcome, and randomly selects a special symbol for display in the special symbol position based on the symbol selection factor. Moreover, the gaming machine determines a number of special symbol positions displayed in the outcome, and determines a probability of selecting a special symbol from a predefined set 120 of special symbols based on the number of displayed special symbol positions. By providing a gaming machine that determines a probability of selecting a special symbol based on the number of special symbol positions displayed in the outcome, the player's expectation for achieving a win is increased and the enjoyment of the game is improved. Thus, the amount of time that the game is played by patrons of a gaming establishment is thereby increased.

Exemplary embodiments of a gaming machine, a gaming system, and a method of allowing a player to play a gaming machine are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A method of allowing a player to play a gaming machine, comprising the steps of:

receiving physical media by an acceptor device, the physical media have a monetary value;

establishing a credit balance associated with the monetary value device;

enabling a player to enter a wager using a user input device and reducing the credit balance by the wager;

displaying, on a display device, a game including a plurality of reels displayed in a display area, each reel of the plurality of reels including a reel strip including a plurality of normal symbols positions and a plurality of special symbol positions;

randomly generating an outcome of the game and displaying the game outcome on the display device, the game outcome including at least one special symbol position being displayed on at least one reel of the plurality of reels in the display area and including at least one of a first number of displayed special symbols positions and a second number of displayed special symbol positions that is greater than the first number of displayed special symbol positions;

determining a symbol selection factor as a function of the generated game outcome;

randomly selecting at least one special symbol from a predefined set of special symbols as a function of the symbol selection factor, the predefined set of special symbols including a first special symbol and a second special symbol, the first special symbol having a first value and the second special symbol having a second value that is greater than the first value, the first special symbol having a first selection probability that is less than a selection probability of the second symbol for the first number of special symbol positions and having a second selection probability that is greater than the selection probability of the second symbol for the second number of special symbol positions;

displaying the game outcome including the selected special symbol displayed in each of the number of special symbol positions; and, modifying the credit balance as a function of the game outcome.

2. A method in accordance with claim 1, further comprising the step of determining the symbol selection factor as a function of a number of special symbol positions being displayed in the game outcome.

3. A method in accordance with claim 1, further comprising the step of:

receiving a wager amount from the player and responsively generating the game outcome; and determining the symbol selection factor as a function of the wager amount.

4. A method in accordance with claim 3, further comprising the steps of:

determining a wager history associated with the player; and determining the symbol selection factor as a function of the player wager history.

5. A method in accordance with claim 1, further comprising the steps of:

determining a status of the player; and determining the symbol selection factor as a function of the player's status.

6. A method of allowing a player to play a gaming machine, comprising the steps of:

receiving physical media by an acceptor device, the physical media have a monetary value;

establishing a credit balance associated with the monetary value device;

enabling a player to enter a wager using a user input device and reducing the credit balance by the wager;

displaying, on a display device, a game including a plurality of reels displayed in a display area, each reel of the plurality of reels including a reel strip including a plurality of normal symbols positions and a plurality of special symbol positions;

randomly generating an outcome of the game and displaying the game outcome on the display device, the game outcome including at least one special symbol position being displayed on at least one reel of the plurality of reels in the display area, wherein the game outcome includes at least one of a first number of displayed special symbols positions and a second number of displayed special symbol positions that is greater than the first number of displayed special symbol positions;

determining a symbol selection factor as a function of the generated game outcome;

determining the symbol selection factor as a function of a number of special symbol positions being displayed in the game outcome;

determining a probability of selecting each special symbol in a predefined set of special symbols based on the number of special symbol positions displayed in the game outcome, wherein the predefined set of special symbols includes a first special symbol having a first value and a second special symbol having a second value that is greater than the first value;

determining the number of special symbol positions displayed in the game outcome; and for the first number of special symbol positions, determining the first special symbol having a selection probability that is less than the second symbol selection probability; and for the second number of special symbol positions, determining the first special symbol having a selection probability that is greater than the second symbol selection probability randomly selecting at least one special symbol from the predefined set of special symbols as a function of the symbol selection factor;

displaying the game outcome including the selected special symbol displayed in the at least one special symbol position, and, modifying the credit balance as a function of the game outcome.

7. A method in accordance with claim 6, further comprising the steps of:

determining the first special symbol having a first selection probability associated with the first number of displayed special symbol positions and a second selection probability associated with the second number of displayed special symbol positions that is greater than the first selection probability; and determining the second special symbol having a third selection probability associated with the first number of displayed special symbol positions and a fourth selection probability associated with the second number of displayed special symbol positions that is less than the third selection probability.

8. A method in accordance with claim 6, further comprising the steps of:

receiving a wager amount from the player and responsively generating the game outcome; and determining the symbol selection factor as a function of the wager amount.

9. A method in accordance with claim 8, wherein the at least one special symbol has a first selection probability associated with a first wager amount and a second selection probability associated with a second wager amount that is different than the first wager amount.

10. A method in accordance with claim 6, further comprising the steps of:

determining a wager history associated with the player; and determining the symbol selection factor as a function of the player wager history.

11. A method in accordance with claim 6, further comprising the steps of:

determining a status of the player; and determining the symbol selection factor as a function of the player's status.

12. A gaming machine, comprising:

an acceptor device configured to receive physical media having a monetary value associated therewith and to establish a credit balance associated with the monetary value;

a display device for displaying a game;

a user input device configured to enable a player to enter a wager that reduces the credit balance and to generate a signal indicative of a player's selection input; and a controller coupled to the display device and the user input device, the controller for displaying the game including a plurality of reels displayed in a display area, each reel of the plurality of reels including a reel strip including a plurality of normal symbols positions and a plurality of special symbol positions, the controller for randomly generating an outcome of the game and for displaying the game outcome on the display device, the game outcome including at least one special symbol position being displayed on at least one reel of the plurality of reels in the display area and including at least one of a first number of displayed special symbols positions and a second number of displayed special symbol positions that is greater than the first number of displayed special symbol positions, the controller for determining a symbol selection factor as a function of the generated game outcome, for randomly selecting at least one special symbol from a predefined set of special symbols as a function of the symbol selection factor, the predefined set of special symbols including a first special symbol and a second special symbol, the first special symbol having a first value and the second special symbol having a second value that is greater than the first value, the first special symbol having a first selection probability that is less than a selection probability of the second symbol for the first number of special symbol positions and having a second selection probability that is greater than the selection probability of the second symbol for the second number of special symbol positions, and for displaying the game outcome including the selected special symbol displayed in each of the number of special symbol positions, the controller further for modifying the credit balance as a function of the game outcome.

13. A gaming machine in accordance with claim 12, the controller for determining the symbol selection factor as a function of a number of special symbol positions being displayed in the game outcome.

14. A gaming machine in accordance with claim 13, the controller for receiving a wager amount from the player and responsively generating the game outcome, and for determining the symbol selection factor as a function of the wager amount.

15. A gaming machine in accordance with claim 14, wherein the at least one special symbol has a first selection probability associated with a first wager amount and a second selection probability associated with a second wager amount that is different than the first wager amount.

16. A gaming machine in accordance with claim 15, the controller for determining a wager history associated with the player and for determining the symbol selection factor as a function of the player wager history.

17. A gaming machine, comprising:

an acceptor device configured to receive physical media having a monetary value associated therewith and to establish a credit balance associated with the monetary value;

a display device for displaying a game;

a user input device configured to enable a player to enter a wager that reduces the credit balance and to generate a signal indicative of a player's selection input; and a controller coupled to the display device and the user input device, the controller for displaying the game including a plurality of reels displayed in a display area, each reel of the plurality of reels including a reel strip including a plurality of normal symbols positions and a plurality of special symbol positions, the controller for randomly generating an outcome of the game and for displaying the game outcome on the display device, the game outcome including at least one special symbol position being displayed on at least one reel of the plurality of reels in the display area, wherein the game outcome includes at least one of a first number of displayed special symbols positions and a second number of displayed special symbol positions that is greater than the first number of displayed special symbol positions, the controller for determining a symbol selection factor as a function of the generated game outcome, determining the symbol selection factor as a function of a number of special symbol positions being displayed in the game outcome, and for determining a probability of selecting each special symbol in the predefined set of special symbols based on the number of special symbol positions displayed in the game outcome, wherein the predefined set of special symbols includes a first special symbol having a first value and a second special symbol having a second value that is greater than the first value, the controller for determining the number of special symbol positions displayed in the game outcome, for determining, for the first number of special symbol positions, the first special symbol having a selection probability that is less than the second symbol selection probability, and for determining, for the second number of special symbol positions, the first special symbol having a selection probability that is greater than the second symbol selection probability, the controller for randomly selecting at least one special symbol from the predefined set of special symbols as a function of the symbol selection factor, and for displaying the game outcome including the selected special symbol displayed in the at least one special symbol position, the controller further for modifying the credit balance as a function of the game outcome.

18. A gaming machine in accordance with claim 17, the controller for determining the first special symbol having a first selection probability associated with the first number of displayed special symbol positions and a second selection probability associated with the second number of displayed special symbol positions that is greater than the first selection probability, and for determining the second special symbol having a third selection probability associated with the first number of displayed special symbol positions and a fourth selection probability associated with the second number of displayed special symbol positions that is less than the third selection probability.

19. A gaming machine in accordance with claim 17, the controller for receiving a wager amount from the player and responsively generating the game outcome, and for determining the symbol selection factor as a function of the wager amount.

20. A gaming machine in accordance with claim 19, wherein the at least one special symbol has a first selection probability associated with a first wager amount and a second selection probability associated with a second wager amount that is different than the first wager amount.

21. A gaming machine in accordance with claim 19, the controller for determining a wager history associated with the player and for determining the symbol selection factor as a function of the player wager history.

22. A gaming machine in accordance with claim 12, the controller for determining a status of the player and for determining the symbol selection factor as a function of the player's status.

23. A system, comprising:

a plurality of gaming devices, each gaming device including an acceptor device configured to receive physical media having a monetary value associated therewith and to establish a credit balance associated with the monetary value, a user input device for enabling a player to enter a wager and accepting a player's selection input and a display device; and a system controller coupled to each gaming device of the plurality of gaming devices for displaying a game on at least one gaming device, the game including a plurality of reels displayed in a display area, each reel of the plurality of reels including a reel strip including a plurality of normal symbols positions and a plurality of special symbol positions, the system controller for receiving a wager amount from a player and responsively randomly generating an outcome of the game and for displaying the game outcome on the display device, the game outcome including at least one special symbol position being displayed on at least one reel of the plurality of reels in the display area and including at least one of a first number of displayed special symbols positions and a second number of displayed special symbol positions that is greater than the first number of displayed special symbol positions, the system controller for determining a symbol selection factor as a function of the wager amount and the generated game outcome, for randomly selecting at least one special symbol from a predefined set of special symbols as a function of the symbol selection factor, the predefined set of special symbols including a first special symbol and a second special symbol, the first special symbol having a first value and the second special symbol having a second value that is greater than the first value, the first special symbol having a first selection probability that is less than a selection probability of the second symbol for the first number of special symbol positions and having a second selection probability that is greater than the selection probability of the second symbol for the second number of special symbol positions, and for displaying the game outcome including the selected special symbol displayed in each of the number of special symbol positions, the system controller further for modifying the credit balance as a function of the game outcome.

24. A system in accordance with claim 23, the system controller for determining the symbol selection factor as a function of a number of special symbol positions being displayed in the game outcome.

25. A system in accordance with claim 24, the system controller for receiving a wager amount from the player and responsively generating the game outcome, and for determining the symbol selection factor as a function of the wager amount, wherein the at least one special symbol has a first selection probability associated with a first wager amount and a second selection probability associated with a second wager amount that is different than the first wager amount.

26. A system in accordance with claim 25, the system controller for determining a wager history associated with the player and for determining the symbol selection factor as a function of the player wager history.

27. A system, comprising:

a plurality of gaming devices, each gaming device including an acceptor device to receive physical media having a monetary value associated therewith and for establishing a credit balance associated with the monetary value, a user input device for enabling a player to enter a wager and for accepting a player's selection input and a display device; and a system controller coupled to each gaming device of the plurality of gaming devices for displaying a game on at least one gaming device, the game including a plurality of reels displayed in a display area, each reel of the plurality of reels including a reel strip including a plurality of normal symbols positions and a plurality of special symbol positions, the system controller for randomly generating an outcome of the game and for displaying the game outcome on the display device, the game outcome including at least one special symbol position being displayed on at least one reel of the plurality of reels in the display area, the system controller for determining a symbol selection factor as a function of the generated game outcome, for determining the symbol selection factor as a function of a number of special symbol positions being displayed in the game outcome, and for determining a probability of selecting each special symbol in the predefined set of special symbols based on the number of special symbol positions displayed in the game outcome, wherein the predefined set of special symbols includes a first special symbol having a first value and a second special symbol having a second value that is greater than the first value, and wherein the game outcome includes at least one of a first number of displayed special symbols positions and a second number of displayed special symbol positions that is greater than the first number of displayed special symbol positions, the system controller for determining a number of special symbol positions displayed in the game outcome, for determining, for the first number of special symbol positions, the first special symbol having a selection probability that is less than the second symbol selection probability, and for determining, for the second number of special symbol positions, the first special symbol having a selection probability that is greater than the second symbol selection probability, the system controller for randomly selecting at least one special symbol from a predefined set of special symbols as a function of the symbol selection factor, and for displaying the game outcome including the selected special symbol displayed in the at least one special symbol position, the system controller further for modifying the credit balance as a function of the game outcome.

28. A system in accordance with claim 27, the system controller for receiving a wager amount from the player and responsively generating the game outcome, and for determining the symbol selection factor as a function of the wager amount, wherein the at least one special symbol has a first selection probability associated with a first wager amount and a second selection probability associated with a second wager amount that is different than the first wager amount.

29. A system in accordance with claim 28, the system controller for determining a wager history associated with the player and for determining the symbol selection factor as a function of the player wager history.

30. A system in accordance with claim 27, the system controller for determining a status of the player and for determining the symbol selection factor as a function of the player's status.

* * * * *